(12) United States Patent
Wilson et al.

(10) Patent No.: US 6,248,467 B1
(45) Date of Patent: *Jun. 19, 2001

(54) COMPOSITE BIPOLAR PLATE FOR ELECTROCHEMICAL CELLS

(75) Inventors: Mahlon S. Wilson; Deanna N. Busick, both of Los Alamos, NM (US)

(73) Assignee: The Regents of the University of California, Los Alamos, NM (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/359,829

(22) Filed: Jul. 23, 1999

Related U.S. Application Data
(60) Provisional application No. 60/105,473, filed on Oct. 23, 1998.

(51) Int. Cl.$^7$ ....................................................... H01M 2/14
(52) U.S. Cl. ................................. 429/39; 429/34; 429/38; 429/210
(58) Field of Search ................................... 429/34, 35, 36, 429/40, 41, 46, 210, 39, 38

(56) References Cited

U.S. PATENT DOCUMENTS

| | | | |
|---|---|---|---|
| 4,197,178 | 4/1980 | Pellegri et al. | 204/255 |
| 4,214,969 | 7/1980 | Lawrance | 204/255 |
| 4,265,727 | 5/1981 | Beckley | 204/242 |
| 4,301,222 | 11/1981 | Emanuelson et al. | 429/251 |
| 4,339,322 | 7/1982 | Balko | 204/255 |
| 4,374,906 | 2/1983 | Breault | 429/44 |
| 4,426,340 | 1/1984 | Goller et al. | 264/29.1 |
| 4,670,300 | 6/1987 | Stewart, Jr. | 427/115 |
| 4,737,421 | 4/1988 | Uemura et al. | 429/34 |
| 4,759,989 | 7/1988 | Abe et al. | 428/408 |
| 4,830,938 | * 5/1989 | McCullough et al. | 429/149 |
| 4,851,304 | 7/1989 | Miwa et al. | 429/40 |
| 4,938,942 | * 7/1990 | Gorman et al. | 423/448 |
| 5,532,083 | 7/1996 | McCullough | 429/210 |
| 5,589,053 | * 12/1996 | Moran et al. | 205/698 |

\* cited by examiner

*Primary Examiner*—Laura Weiner
(74) *Attorney, Agent, or Firm*—Ray G. Wilson

(57) ABSTRACT

A bipolar separator plate for fuel cells consists of a molded mixture of a vinyl ester resin and graphite powder. The plate serves as a current collector and may contain fluid flow fields for the distribution of reactant gases. The material is inexpensive, electrically conductive, lightweight, strong, corrosion resistant, easily mass produced, and relatively impermeable to hydrogen gas. The addition of certain fiber reinforcements and other additives can improve the properties of the composite material without significantly increasing its overall cost.

14 Claims, 3 Drawing Sheets

COMPOSITE BIPOLAR PLATE FOR ELECTROCHEMICAL CELLS

This application claims benefit of provisional application Ser. No. 60/105,473, filed Oct. 23, 1998.

This invention relates to electrochemical cells and, more particularly, to fuel cells using polymer electrolyte membranes. This invention was made with government support under Contract No. W-7405-ENG-36 awarded by the U.S. Department of Energy. The government has certain rights in the invention.

BACKGROUND OF THE INVENTION

In an exemplary application, polymer electrolyte fuel cells (PEFCs) are currently under development to produce electrical power for a variety of stationary and transportation applications. To produce useful currents and voltages, individual fuel cells are connected in series to form stacks of cells. Adjacent cells in a stack are typically separated by bipolar plates, which serve as the anode for one fuel cell and the cathode for the adjacent cell. Thus the bipolar plate must function as a current collector as well as an impermeable barrier between the gases on either side of the plate. In addition, many stack designs incorporate gas flow channels into the bipolar plate. These flow fields ideally provide equal distribution of reactant gases over the entire area of a catalyzed proton exchange membrane. Flow fields are commonly molded or machined into both sides of a bipolar plate, with an anode flow field on one side and a cathode flow field on the other side.

To date, the bipolar plate remains the most problematic and costly component of PEFC stacks, as well as other electrochemical cells, such as alkaline fuel cells, zinc-air batteries, and the like. The most commonly used material for single cell testing is machined graphite, which is expensive and costly to machine. The brittle nature of graphite also prevents the use of thin components for reducing stack size and weight, which is particularly important for transportation applications. Other stack designs consider the use of metal hardware such as stainless steel. But a number of disadvantages are associated with stainless steel, including high density, high cost of machining, and possible corrosion in the fuel cell environment. Still other designs use graphite/poly(vinylidene fluoride) composites, which can be relatively brittle and expensive and require long process cycle times. Attributes of a suitable material include:

i) high electronic conductivity;
ii) low weight;
iii) low permeability;
iv) physical and chemical stability under fuel cell operating conditions
v) low cost of mass production.

RELATED ART

Thermoplastic composite materials for use in fuel cell bipolar plates are described in U.S. Pat. No. 4,214,969 (Lawrance) and U.S. Pat. No. 4,339,322 (Balko et al.). The '969 patent describes a molded graphite/poly(vinylidene fluoride) material, and the '322 patent claims improvements in the mechanical properties of the same with the addition of carbon fibers. However, thermosetting resins tend to offer the important advantage of shorter process cycle times over thermoplastics. Bipolar plate materials comprising graphite in thermosetting resin matrices are described in U.S. Pat. No. 4,301,222 (Emanuelson et al.), U.S. Pat. No. 4,265,727 (Beckley), U.S. Pat. No. 4,670,300 (Stewart), U.S. Pat. No. 4,737,421 (Uemura et al.) and U.S. Pat. No. 4,197,178 (Pellegri et al.). The '222 patent describes graphite/phenolic composites, but due to porosity and corrosion issues other resins are currently preferred over phenolics. The '727 patent describes thermosetting resin composites filled with a combination of graphite fibers and graphite powders of specific dimensions. The advantage of rapid cure cycles for thermosetting resins is diminished if additional process steps (such as coatings or heat treatments) are required. The '300 and '421 patents describe composite plates formed by carbonizing or graphitizing precursor sheets of cellulose fibers and a thermosetting resin. The '178 patent describes materials comprising molded aggregates of an electrically conductive powdered material and a thermosetting resin, preferably epoxy, which are coated with a layer of a chemically resistant, nonconducting thermosetting resin.

Various attributes, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the apparatus of this invention may comprise a bipolar plate for use in an electrochemical cell, said plate being formed from a thermosetting vinyl ester resin having a conductive powder embedded therein in an amount sufficient to impart a desired level of electrical conductivity to said plate. In preferred embodiments of the invention, said conductive powder is graphite with particle sizes predominantly in the range of 80 to 325 mesh. The bipolar plate may further include short fiber reinforcements such as glass, polymer, graphite/carbon, and cotton.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION OF THE INVENTION

Figure 1:
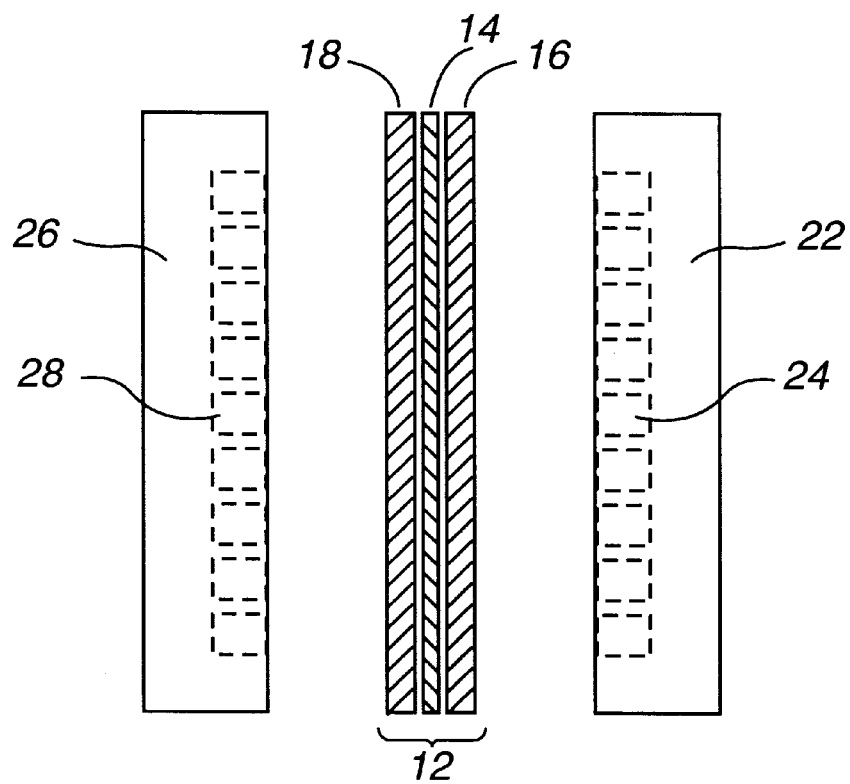
FIG. 1 is an exploded view, in cross-section, of a fuel cell assembly.
Figure 2:
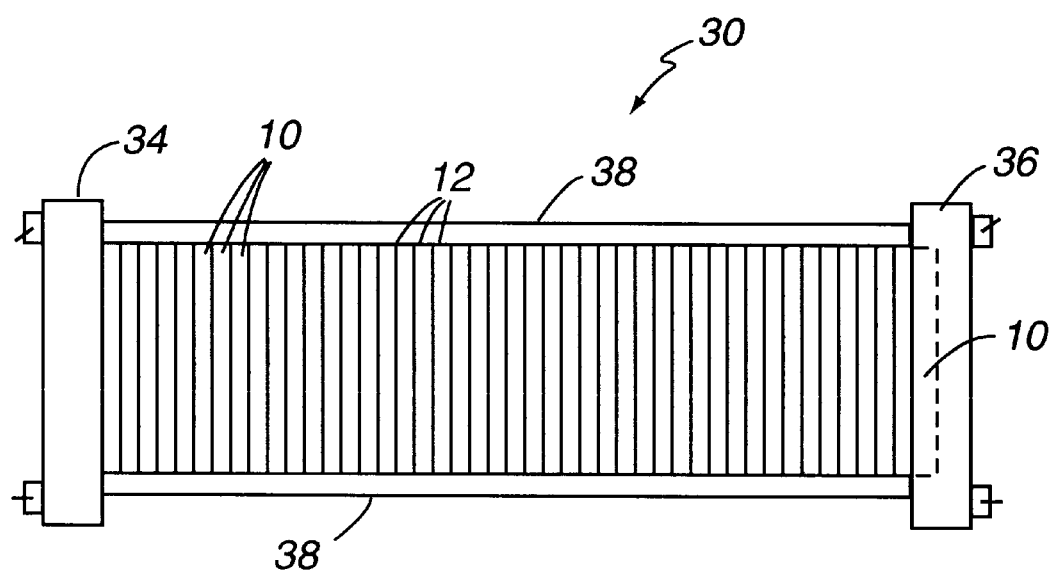
FIG. 2 is a side view of an assembled fuel cell stack.

FIGS. 1 and 2 generically depict a fuel cell assembly and a fuel cell stack and illustrate an exemplary electrochemical cell for utilizing the benefits of the present invention. FIG.

1 is an exploded view, in cross-section, of a fuel cell assembly. Membrane electrode assembly 12 is formed from a proton conducting membrane 14, which is preferably a polymer electrolyte, that is placed between anode 16 and cathode 18. Membrane electrode assembly 12 is placed between conductive plates 22 and 26, which supply various fluids across the face of electrodes 16, 18 through flow field passages 24, 28, respectively.

Conductive plates 22, 26 may be configured as bipolar plates by incorporating anode and cathode flow field passages 24, 28 into opposite faces of a single conductive plate. Such plates are conventionally known as bipolar plates since the plates generally contact the cathode of one cell 12 and the anode of an adjacent cell 12 when a fuel cell stack is formed, as shown in FIG. 2.

In FIG. 2, a plurality of membrane electrode assemblies 12 are placed alternately in series with bipolar plates 10, which serve to electrically connect in series anodes 16 and cathodes 18 (see FIG. 1 for fuel cell assembly references). End plates 34, 36 contact end ones of bipolar plates 10, and tie rods 38 are tightened to compress the stack of bipolar plates 10 and membrane electrode assemblies 12 between end plates 34, 36. In many stack designs, cooling plates are periodically interspersed between the fuel cell assemblies. Instead of a reactant, coolant is distributed in some manner across the plate. Since the cooling plates basically need to satisfy the same requirements as the bipolar plates (e.g., conductivity, strength, flow distribution, etc.) and may be configured such that one side distributes coolant and the other side reactant, etc., such components will also be considered under the general term "bipolar plates". One figure of merit for fuel cell stack assemblies 30 is the power density, i.e., the amount of power produced per unit volume. Thus, providing thinner bipolar plates with molded fluid passages would act to increase the power density and decrease the cost per unit power output.

In accordance with the present invention, stronger and less costly bipolar plates are provided by forming a conductive composite plate, which may have molded fluid passages and a new fiber additive for increased strength and concomitant reduction in thickness. A thermosetting resin of the vinyl ester family is used as a matrix material for composite bipolar plates. Vinyl esters are methacrylated epoxy difunctional polyesters, and as such are often described as a cross between polyester and epoxy resins. Indeed, both the price and mechanical properties of vinyl esters fall between those of polyesters and epoxies, but vinyl esters outperform both polyesters and epoxies in toughness (elongation) and corrosion resistance.

A variety of agents may be used to facilitate the curing of vinyl ester resins, either at room temperature or at elevated temperatures. Vinyl ester resins cure by free radical polymerization, so a catalyst or initiator is required to cure the resin. The most commonly used catalysts are organic peroxides (such as methyl ethyl ketone peroxide (MEKP), benzoyl peroxide (BPO), and cumene hydroperoxide (CHP)). Other peroxy-type compounds (such as peroxyesters, peroxyketals, and peroxydicarbonates) and non-peroxide free radical sources (such as azonitrile compounds) may also be used.

Promoters and/or accelerators can be used in conjunction with organic catalysts to speed curing. Typical promoters are cobalt naphthenate and cobalt octoate, and accelerators include N,N-Dimethylaniline (DMA), N,N-Diethylaniline (DEA), and N,N-Dimethylacetoacetamide (DMAA). Some resins are prepromoted by their suppliers. If a very slow cure is desired, 2,4-Pentanedione may be used to retard the gel time. For MEKP-catalyzed systems, foaming of the resin upon addition of MEKP is sometimes problematic, especially at the concentrations required for rapid gel times; an assortment of proprietary surfactants, anti-foam agents, and non-foaming MEKP substitutes may be used to reduce foaming.

While very rapid cure times can be achieved with the proper combination of catalyst and temperature, the pot life (shelf life) of catalyzed vinyl ester resins can be quite short—on the order of a few hours. Both substantially longer shelf lives (weeks or months) and rapid cures can be achieved with the use of radical-scavenging inhibitors (examples include quinones and cresols). Inhibitors can be added to resins along with catalysts and other additives, or may already be present in resins as they are received from the supplier. At room temperature, inhibitors prevent polymerization of the resin by combining with free radicals produced by the gradual decomposition of the catalyst. At elevated processing temperatures, increased radical formation quickly consumes any remaining inhibitor and polymerization occurs.

Release agents (or lubricants) such as waxes and metal stearates may be added to the resin to facilitate removal of hardened parts from the mold. These so-called "internal" mold releases can prevent parts from sticking to the mold while avoiding the time- and labor-intensive application of an "external" release agent to the mold surfaces before molding each part. The incorporation of internal mold release agents results in the formation of a lubricious surface layer on the finished part, but does not adversely affect the conductivity of the composite.

A conductive powder, preferably graphite, of a range of particle sizes predominantly between 80 and 325 mesh, is added to the formulated resin to impart electrical conductivity to the composite. While the preferred embodiments utilize graphite as the conductive powder component of the material, it can be appreciated that conductive particles or powders other than graphite (e.g. metals, boron carbide, titanium nitride) may also be suitable for these composites. However, graphite has the advantages of low cost, low weight, ready availability, and chemical stability for this application.

A percolated (connected) network of conductive particles must be formed to produce an electrically conductive composite. Graphite typically percolates around 20 volume percent in a binary system, but carbon black can percolate at concentrations of less than one volume percent. Thus it may be beneficial to add small amounts (up to about 5 weight percent) of carbon black to effectively increase the number of electrical contacts between the conducting particles. Carbon black may also be useful for controlling compound rheology due to its high surface area.

An upper limit on the amount of graphite particles is determined by the need to provide enough resin to maintain plate integrity. This upper limit is about 95% graphite by weight. Thus, depending on the particular fuel cell design, the graphite particle loading should be between 20–95 % by weight.

Conventional composites are typically fiber reinforced to provide additional strength and/or flexibility. Traditional fiber reinforcements for structural composites include graphite, glass, Kevlar, and metal. The fibers are typically used as is but may have surface treatments designed to improve fiber-resin adhesion. "Sized" glass fibers, for example, possess functional groups at the surface that can improve adhesion or provide chemical bonds to the resin. In general, these high-strength traditional fibers impart vastly improved mechanical properties in structural composites where long fibers or fabric rovings are used and the volume fractions of resin are typically quite high (e.g., 60% or more). In the case of electrically conductive composites for electrochemical applications, any fiber reinforcements that are used need to be relatively short to attain good fill, avoid hand lay-up, and provide a relatively homogenous structure. As a result, short "microfibers" (<1 mm) are utilized. On the other hand, the volume fractions of resin and fiber in the conductive composite must be considerably lower to accommodate the conductive powder component. As such, it is difficult for a resin to sufficiently encapsulate or adhere to the fibers to effectively utilize the superior mechanical properties of the fibers.

Improving the fiber/resin adhesion in such composites is required to adequately capitalize upon the fiber reinforcement. One approach is to use a fiber of similar nature as the resin such that a more compatible interface is obtained. Short polyester or polyacrylontirile microfibers, commonly referred to as "flock", could conceivably provide enhanced polymer/resin interfaces and are readily available.

A novel method of improving the "adhesion" of the resin to the fiber is to utilize a porous microfiber that imbibes the resin such that the resin/fiber interface is effectively continuous. Porous, hollow fibers are widely utilized for separations, etc., but are not readily available on a microfiber scale. Activated carbon microfibers and porous ceramic whiskers are commonly available but adequate inclusion of the resin and cost are issues. The most effective fiber that we have found for this purpose is cotton flock. The cotton fibers readily swell with resin and the cured structures thus formed effectively become micro-composite fibers that are integrally linked with the remainder of the resin matrix. At only 40,000–120,000 psi, cotton does not have the tensile strength of graphite (520,000 psi) or glass (200,000–300,000 psi) fibers. However, the direct link with the resin component allows a more effective use of the fiber component, and in conjunction with certain vinyl ester resins the cotton-reinforced composites exhibit substantially improved mechanical properties over the composites utilizing the traditional fibers.

Fluorochemical intermediates such as fluoroalkylacrylates and fluoroalkyl olefins may also be added to the mixture to enhance the surface properties of the composite. Both the ease of release from a mold and the surface hydrophobicity of a bipolar plate may be improved using these additives. Depending upon the approach adopted by the stack designer, hydrophobic channel walls are often desirable for effective water transport and removal within the flow fields. Fluorochemical intermediates tend to migrate to the surface when dissolved or dispersed in other media, allowing the perfluoroalkyl groups to concentrate on the surface chemically linked by the functional groups to the resin. Additions to the resin of only a few volume percent substantially lowers the surface energy and discourages the accumulation of water in the channels.

To prepare the mixture of materials for a bipolar plate, the liquid component is formulated first by combining the catalyst and any other desired additives (such as promoters, accelerants, inhibitors, antifoam agents, fluorochemical intermediates, mold release agents, etc.) with the resin and mixing thoroughly. The pre-blended solids (graphite, fibers, carbon black, etc.) are then mixed into the formulated liquid resin to form a homogeneous compound with a friable, paste-like consistency. For laboratory scale development, mixing can be accomplished with a kitchen-type hand mixer. At both small and large scales, no heat is generated during mixing, so mixer cooling is not required. To form the bipolar plate, the amalgamated resin/graphite/reinforcement mixture is molded into its final shape (which may include flow fields) under heat and pressure. Depending upon the cure kinetics of the particular resin/catalyst system used, the part may or may not require subsequent heating in an oven to ensure complete cure of the resin. Specific embodiments of the invention are given below.

SAMPLE EMBODIMENTS

Small-scale Samples

A number of small scale (1 inch diameter) non-reinforced samples were prepared primarily to evaluate the dependency of composite conductivity on the resin/graphite concentrations as well as the graphite type and size distribution. In one such sample, 5 mL of Hetron 922 vinyl ester resin (Ashland Chemical) was promoted with 0.028 mL (0.56 PHR) of cobalt naphthenate (CoNap) and catalyzed with 0.056 mL (1.11 PHR) of methyl ethyl ketone peroxide (MEKP). 4 g of Asbury graphite 4012 (synthetic, −100/+325 mesh) was added to the formulated resin and mixed to form a stiff paste. 1.5 g of the paste was pressed in a preheated (80° C.) circular plunger-type mold (1 inch cavity diameter) between fiber-reinforced Teflon disks. The bottom plunger was sealed with an O-ring so that extrusion of resin could only occur around the top plunger. A force of 3000 lbs was immediately applied to the mold and held during heating to 100° C. Once the mold reached 100° C., pressure and temperature were maintained for 15 minutes, and then the hardened part was removed from the mold. The part was then postcured in an oven at 100° C. for one hour. Properties of the finished part are given below.

Density: 1.66 $g/cm^3$ Electrical Conductivity: 100 S/cm
Flexural Strength: 4400 psi Elongation (bending): 0.6%
$H_2$ Permeability: Undetectable (<<0.01 $mA/cm^2$ $H_2$ equivalent)

Special jigs were used in the mechanical testing apparatus to accommodate the small samples. The hydrogen permeabilities were obtained by measuring the amount of hydrogen that would permeate through a sample with a 30 psi pressure drop. The conductivities were measured using a 4-point probe. In the sample above, the conductivity and permeability are more than adequate for fuel cell applications and the mechanical properties are probably sufficient in many cases, although a primary impetus is to improve the mechanical properties sufficiently to reliably minimize plate thickness.

Figure 3:
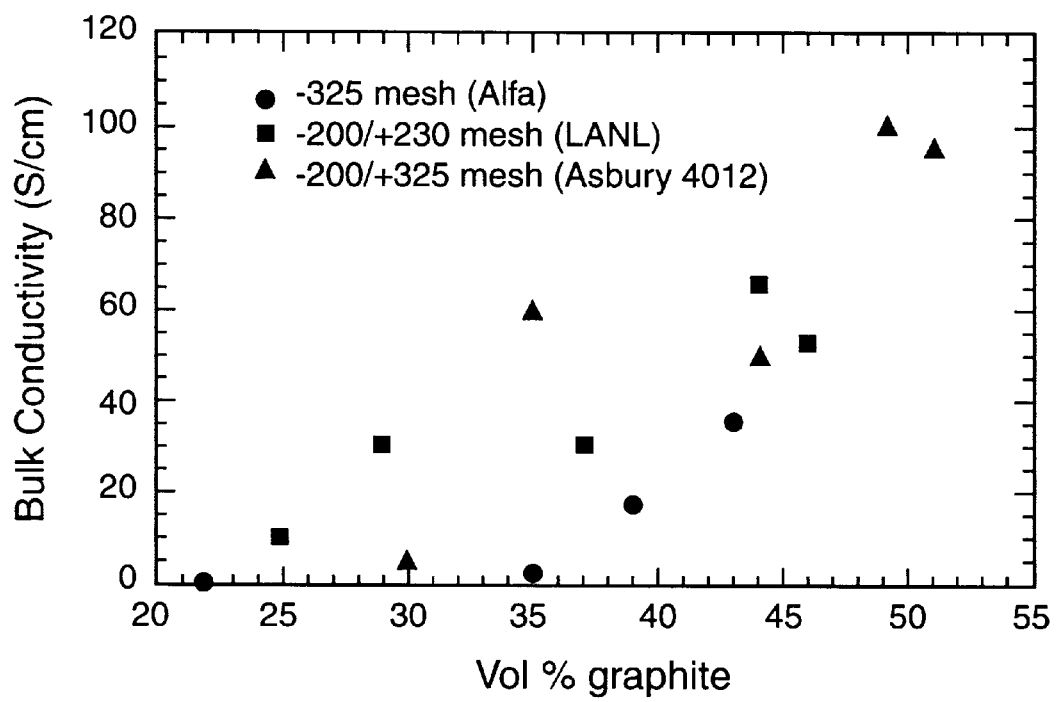
FIG. 3 graphically depicts the electrical conductivity of resin/graphite samples as functions of graphite size distribution and volume fraction.

FIG. 3 depicts the sample conductivities for the family of 1″ diameter resin/graphite samples as functions of graphite size distribution and volume fraction. While the prior art uses all ranges of graphite particle sizes, we have observed that, within a certain size range, larger particles result in higher sample conductivities. However, if the particles are much greater than 150 microns in diameter, they do not wet or mix well. FIG. 3 illustrates the conductivity improvements attained with a −200/+230 mesh (60–75 µm diameter) graphite mixture sieved in our labs and a commercial product, Asbury 4012 synthetic graphite (nominally −100/+325 mesh or 44–150 µm), compared to samples utilizing −325 mesh (<44 µm) graphite. While the narrow 60 to 75 micron distribution of the material sieved in our labs may have some advantages at low graphite volume fractions, the Asbury product with its wider particle size distribution appears to be its equal at higher concentrations, and is readily available and inexpensive. Within the ranges depicted, there appear to be distinct advantages with intermediate graphite particle sizes and relatively narrow distributions.

Large-scale Samples With Fiber Additives

A number of large plates were molded to compare the relative merits of graphite, glass, polyester and cotton fibers. Samples with roughly similar compositions were chosen to approximate a straight-across comparison. The paste mixtures for the compositions given in Table I were based on 60 mL of Hetron 922 vinyl ester resin, 10 g of the indicated fiber (if any) and 0.6 mL of BYK A-555 organic defoamer. Asbury graphite powder 4012 was used as the conductive component. The mixed pastes were pressed between metal foils using a 100 mil aluminum spacer plate with a 6×6 inch cavity. Each sample was held under the indicated pressing force for 15 minutes at a temperature of 110° C., then removed to an oven for a one-hour postcure at 100° C. Properties of the cured plates are listed in Table II.

TABLE I

Composition of large-scale samples with fiber additives

| Fiber Reinforcement | Amount of Component | | | Press |
| --- | --- | --- | --- | --- |
| | CoNap (mL) | MEKP (mL) | Graphite (g) | Force (tons) |
| None | 0.17 | 1.25 | 140 | 35 |
| Graphite (Asbury AGM94M) 7.4 µm dia. × 200 µm | 0.14 | 1.00 | 124 | 40 |
| Glass (Fibertec 9110 E-glass) 16 µm dia. × 800 µm | 0.17 | 1.25 | 134 | 35 |
| Polyester (Claremont Flock) 3.0 denier × 500 µm | 0.17 | 1.25 | 134 | 35 |
| Cotton (Claremont Flock) 1.3–2.0 denier × 380 µm | 0.14 | 1.00 | 132 | 30 |

TABLE II

Properties of large-scale samples with fiber additives

| | Type of Fiber Reinforcement | | | | |
| --- | --- | --- | --- | --- | --- |
| | None | Graphite | Glass | Polyester | Cotton |
| Areal Conductivity (S/cm$^2$) | 360 | 150 | 380 | 190 | 93 |
| Tensile Strength (psi) | 3600 | 4100 | 3100 | 3300 | 5800 |
| Flexural Strength (psi) | 5300 | 8200 | 5400 | 5900 | 8900 |

The plates characterized in Table II are slightly thicker than the 2.5 mm spacer plate due to differing rheologies and extrusion amounts for the various formulations which are, to some extent, controlled by the pressing force. While the areal (through-plate) conductivity of a bipolar plate is indicative of its actual contribution to cell resistance within a stack, this property is very difficult to measure directly. Instead, bulk (in-plane) conductivities are generally measured with a four-point probe device when comparisons of different materials are desired, as in Table II. The bulk conductivity of a bipolar plate can be controlled by the amount of graphite in the plate and is also influenced by the amount and type of fiber added to the composite. For fuel cell applications, the composite plate of the present invention is forulated to have a bulk conductivity of at least about 10 S/cm. Another current target for bipolar plates is an areal conductivity of 200 S/cm$^2$. An areal conductivity of 200 S/cm$^2$ corresponds to a contribution to cell resistance of 0.005 ohm-cm$^2$, which is considerably less than the roughly 0.1 ohm-cm$^2$ contributions of the other components of a unit cell. While an areal conductivity goal of 200 S/cm$^2$ appears reasonable, the requirements for a particular stack are highly design-dependent. Indeed, conductivity requirements may be relaxed substantially in favor of increased mechanical strength and/or reduced plate thickness. For example, an areal conductivity of 200 S/cm$^2$ corresponds to a bulk conductivity of 60 S/cm for a 3 mm thick plate, and 40 S/cm for a 2 mm thick plate. If the filler content is reduced and/or reinforcing fibers are incorporated into the plate, the resultant reduction in conductivity will be accompanied by an increase in strength. Thus, thinner plates with the same contribution to cell resistance can be fabricated. The stronger plates will be able to withstand manufacturing and stack assembly at the reduced thickness, and will ultimately make possible a reduction in overall stack size.

In Table II, it is observed that the conductive graphite fibers provide lower composite conductivities than most of the non-conductive fibers. We have previously observed similar results with thermoplastic and epoxy resins so the effect is not unique to these particular formulations. In a similar vein, the tensile strengths of the glass and polyester fiber reinforced compositions are no higher than the non-reinforced sample although the flexural strengths are slightly higher. It appears that the use of a sized glass fiber or a polymer fiber does not appreciably enhance the fiber/resin adhesion. The one traditional structural fiber that does noticeably improve mechanical properties is the graphite fiber. Perhaps the resin readily wets, encapsulates and isolates the graphite fibers to a moderate degree which would improve the mechanical properties and may also explain why the conductive fibers do not contribute to the sample conductivity.

The clearly superior fiber from a mechanical properties perspective is the cotton flock. As discussed above, the cotton readily imbibes the resin which apparently results in a sturdier and more continuous reinforcement matrix. As shown in Table II, the mechanical strengths of the composite with the cotton was substantially increased over the other reinforcements—about 60% better in tensile and 70% better in flexural over the non-reinforced sample. The dramatic improvement illustrates the advantages of using a porous fiber that readily imbibes the resin.

Figure 4:
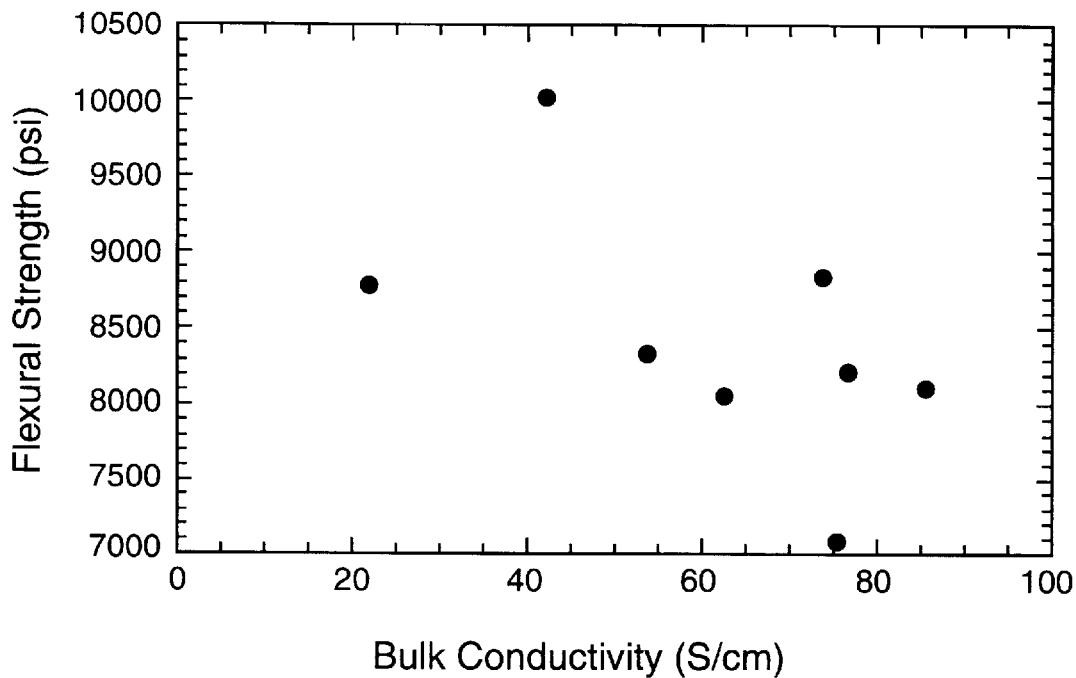
FIG. 4 graphically displays the values of electrical conductivity and flexural strength for various bipolar plate materials containing cotton fibers.

While the electronic conductivity of the cotton flock sample in Table II was not particularly high in the "straight-across" comparison, it is possible to capitalize on the enhanced strength offered by the porous fibers while retaining high electrical conductivity by merely altering the composition of the material. To this end, additional samples containing cotton fibers were produced similarly to those in Table I. These samples generally had good electrical conductivities, and their mechanical properties were not significantly compromised by the change in composition relative to the lower-conductivity sample, as shown in FIG. 4.

While not listed with the other properties in Table II, the hydrogen gas permeability is also an important issue for the larger bipolar plates. As with the smaller samples, the large samples tested for H$_2$ permeability exhibited very little hydrogen flux, well below the upper limit of <1 mA/cm$^2$ equivalent (with the hydrogen ΔP=30 psi).

Figure 5:
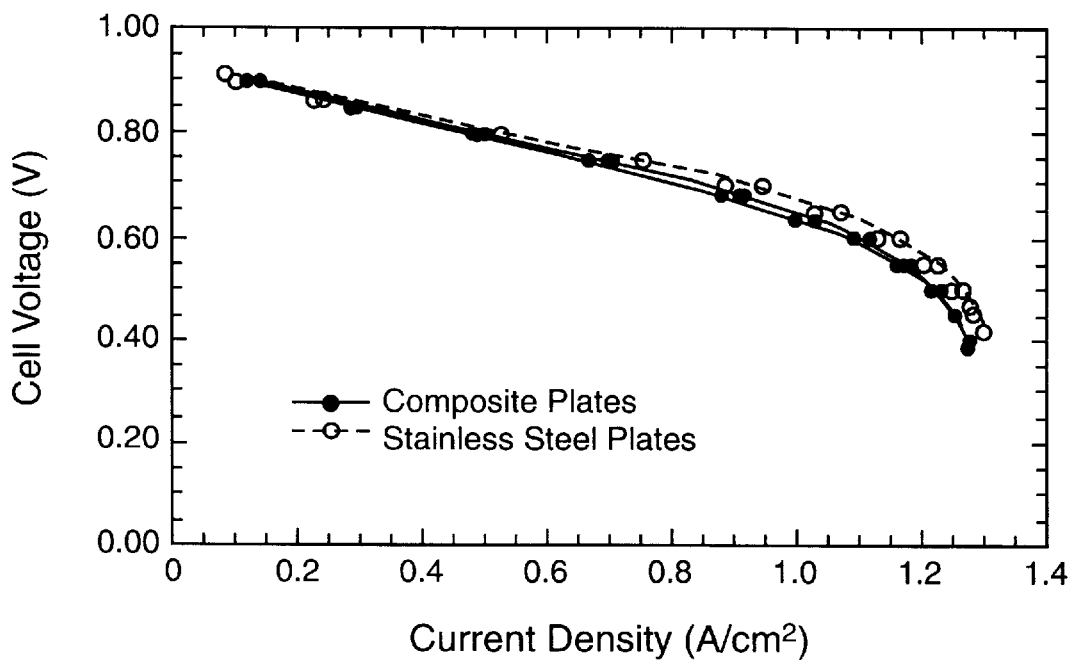
FIG. 5 shows polarization curves for stainless steel and graphite/vinyl ester composite bipolar plates under similar conditions.

Bipolar plates of some of the above compositions have been tested in single-cell fuel cells, where they have provided performances comparable to that of traditional bipolar plate materials throughout the relevant operating range. A typical polarization curve for a 68% graphite unreinforced composite bipolar plate is shown in FIG. 5, along with similar data for stainless steel (data courtesy of Plug Power, LLC).

While the materials described above are very easily machined, from a mass-production standpoint it is essential that fluid flow fields be able to be molded directly into the plates as they are being formed. The relatively fine features of most flow field designs presents the major challenge to their direct molding. However, serpentine flow channels with widths, depths, and islands on the order of 1 mm have been accurately molded into plates of the above compositions.

Other Embodiments

Although the above embodiments have demonstrated that fiber reinforcements can provide improvements in composite strength, the degree of improvement is dependent on the effectiveness of fiber-resin bonding. For example, cotton fibers may provide less strengthening when combined with very viscous resins due to a reduced ability of the resin to soak into the porous fibers. In addition, surfactant or mold release additives in the resin may affect fiber-resin adhesion. Hence, various fiber reinforcements may be useful for moderate strengthening, but as with all highly-loaded particulate composites, the mechanical properties of graphite/vinyl ester composites are dominated by the resin. Some vinyl ester resins are clearly superior to others in their contributions to the overall strength of a composite. Additionally, improvements can be made to a material's processability for compression, injection, or injection-compression molding with the use of various additives. Specific choices of catalyst systems and/or other additives can improve cure time and shelf life. Preferred embodiments of the invention take advantage of these methods of enhancement.

Using their proprietary commercial processes, Premix, Inc. (North Kingsville, Ohio.), prepared compression molded composite panels containing graphite powder in vinyl ester in ratios specified by us. The composite plates of their compositions demonstrated improved properties and processability over earlier embodiments. These improvements included rapid cure cycle time (~3 minutes or less), extended shelf life (several weeks), more uniform rheology, and improved part ejection. Bipolar plates prepared by Premix have demonstrated good performance in both single fuel cells and short stacks. At our direction, Bulk Molding Compounds, Inc., (BMC) produced materials with similar improvements that were processed by both compression and injection-compression molding. Typical properties of some of the embodiments produced by Premix and BMC are listed in Table II, along with properties of a "baseline" laboratory-scale embodiment and a currently commercially available graphite/thermoplastic bipolar plate material. The compositions are given in weight percent of the identified materials.

TABLE III

Property Comparison for Various Embodiments

| | Flexural Strength | Tensile Strength | Conductivity |
|---|---|---|---|
| Commercial graphite/thermoplastic | 3000 psi | 2800 psi | 105 S/cm |
| Los Alamos "baseline" (68% graphite, comp. molded) | 4300 psi | 3400 psi | 60 S/cm |
| Premix proprietary material (68% graphite, comp. molded) | 4100 psi | 3500 psi | 85 S/cm |
| BMC proprietary material (69% graphite, 2% cotton, 1% carbon black, comp. molded) | 5500 psi | 3800 psi | 30 S/cm |
| BMC proprietary material (70% graphite, inj-comp. molded) | 5600 psi | 4400 psi | 12 S/cm |

For all of the above listed embodiments, and for most other useful formulations utilizing this general approach, the total estimated materials cost for bipolar plates is currently less than $4/kg, even with the relatively expensive graphite fibers; the cotton and polyester fiber alternatives and unreinforced formulations drop the cost below $3/kg. Bipolar plates may be formed from these formulations using compression, injection, or injection-compression molding. It appears conceivable to mass produce plates at a cost of $10/kg, which allows well over half the total for production costs (a $10/kg cost for the bipolar plates is believed to be cost-competitive for transportation applications). The production costs with this approach should be low because the flow fields would be molded directly into the plates and no machining, heat treatments, coatings, or surface treatments are required. Particularly in the case of compression molding, the short process-cycle times also help to keep production costs low compared to plates based on thermoplastic composites such as Kynar (as in '969 and '322).

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A bipolar plate having flow channels on faces of the plate for use in an electrochemical cell comprising an electrically conductive plate molded from a thermosetting vinyl ester resin matrix having a conductive powder embedded therein in an amount effective to provide a electrical conductivity of at least about 10 S/cm for said bipolar plate and having the flow channels formed in the thermosetting vinyl ester resin matrix.

2. A bipolar plate according to claim 1, wherein said electrically conductive plate further includes short (<1 mm) reinforcement fibers selected from the group consisting of graphite/carbon, glass, cotton, and polymer.

3. A bipolar plate according to claim 2, wherein said conductive powder is graphite with particle sizes predominantly in the range of 80 to 325 mesh.

4. A bipolar plate according to claim 1, wherein said conductive powder is graphite with particle sizes predominantly in the range of 80 to 325 mesh.

5. A bipolar plate according to claim 1, further including fluorochemical intermediates forming perfluoroalkyl groups on surfaces of said electrically conductive plate.

6. A bipolar plate for use in an electrochemical cell comprising an electrically conductive plate molded from a vinyl ester resin binder having graphite powder and short cotton fibers embedded therein.

7. A bipolar plate according to claims 6, wherein said graphite powder has particle sizes predominantly in the range of 80 to 325 mesh.

8. A bipolar plate according to claim 6, further including fluorochemical intermediates forming perfluoroalkyl groups on surfaces of said electrically conductive plate.

9. A material composition for electrochemical cell bipolar plates comprising:
 a vinyl ester resin;
 a surface modifying agent of a fluorochemical intermediate effective to provide for mold release and for surface hydrophobicity; and graphite powder having particle sizes predominantly between 80 and 325 mesh in the range 20 to 95% by weight.

10. A material composition according to claim 9 further including a quantity of carbon black in the range of 0 to 5% by weight.

11. A material composition according to claim 9 where the surface modifying agent is a fluorochemical intermediate selected from the group consisting of fluoroalkylacrylates and fluoroalkylolefins.

12. A material composition according to claim 9 further including cotton fibers having a length less than about 1 mm.

13. A bipolar plate for use in an electrochemical cell consisting essentially of an electrically conductive plate molded from a thermosetting vinyl ester resin matrix; a conductive powder; and reinforcement fibers selected from the group consisting of graphite/carbon, glass, cotton, and polymer.

14. A bipolar plate according to claim 13, wherein said conductive powder is graphite with particle sizes predominantly in the range of 80 to 325 mesh.

* * * * *